(12) United States Patent
Heselhaus et al.

(10) Patent No.: US 7,303,225 B2
(45) Date of Patent: Dec. 4, 2007

(54) TARGA ROOF SYSTEM FOR VEHICLE AND ASSOCIATED VEHICLE

(75) Inventors: Udo Heselhaus, Ibbenbüren (DE); Winfried Bunsmann, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 10/564,498

(22) PCT Filed: Jul. 8, 2004

(86) PCT No.: PCT/DE2004/001472

§ 371 (c)(1), (2), (4) Date: Jul. 28, 2006

(87) PCT Pub. No.: WO2005/007432

PCT Pub. Date: Jan. 27, 2005

(65) Prior Publication Data

US 2006/0279103 A1    Dec. 14, 2006

(30) Foreign Application Priority Data

Jul. 12, 2003    (DE) .............................. 103 31 625

(51) Int. Cl.
*B60J 7/02* (2006.01)

(52) U.S. Cl. ........................... 296/107.18; 296/107.19; 296/123

(58) Field of Classification Search ........... 296/107.01, 296/107.16, 107.17, 107.18, 107.19, 107.2, 296/123, 216.01, 216.02, 216.04, 218, 219
See application file for complete search history.

(56) References Cited

U.S. PATENT DOCUMENTS 1,225,384 A * 5/1917 Wildau ...................... 296/116

(Continued)

FOREIGN PATENT DOCUMENTS

CH    650980 A * 8/1985    ................. 296/108

(Continued)

*Primary Examiner*—Dennis H. Pedder
*Assistant Examiner*—Paul Chenevert
(74) *Attorney, Agent, or Firm*—Michael Best & Friedrich LLP (57) ABSTRACT

A Targa roof system for a vehicle includes a roof part (10) for spanning a compartment between a cross member (4), including the upper side of a windshield, and a traverse cross beam (8), which traversely spans a vehicle inner compartment and is spaced from the cross member (4). Guide elements (20, 22) are affixed in the rear area of the roof part (10) on both sides thereof, the guide elements being spaced from each other in the longitudinal direction of the roof part. The roof part (10) is pivotable from its closed position about the two guide elements (20, 22), which oppose each other with reference to the vehicle width, and subsequently is lowerable downwardly guided along the guide rails (24) into a stowed position by the forward guide element (20) and the rear guide element (22) without pivoting.

20 Claims, 11 Drawing Sheets

U.S. PATENT DOCUMENTS

| | | | | |
|---|---|---|---|---|
| 1,278,837 | A | * | 9/1918 | Birney .................... 296/107.2 |
| 1,784,279 | A | * | 12/1930 | Ellerbeck ............... 296/107.18 |
| 4,165,122 | A | * | 8/1979 | Bertone ................. 296/107.18 |
| 4,968,089 | A | * | 11/1990 | Murai et al. ................. 296/219 |
| 5,056,857 | A | * | 10/1991 | Ney et al. ................ 296/107.2 |
| 5,078,447 | A | * | 1/1992 | Klein et al. .............. 296/107.2 |
| 5,558,388 | A | * | 9/1996 | Furst et al. .............. 296/107.2 |
| 5,975,620 | A | * | 11/1999 | Jambor et al. ............... 296/108 |
| 5,979,970 | A | * | 11/1999 | Rothe et al. ........... 296/107.17 |
| 6,604,782 | B2 | * | 8/2003 | De Gaillard et al. ... 296/216.04 |
| 6,827,392 | B2 | * | 12/2004 | Doncov et al. ............. 296/147 |
| 7,172,242 | B2 | * | 2/2007 | Heselhaus ................... 296/219 |
| 2002/0024231 | A1 | | 2/2002 | Schutt |
| 2004/0113453 | A1 | * | 6/2004 | Guillez et al. ........... 296/107.2 |

FOREIGN PATENT DOCUMENTS

| | | | | |
|---|---|---|---|---|
| DE | 195 03 786 A1 | | 8/1996 | |
| DE | 101 26 974 C1 | | 11/2002 | |
| EP | 0 261 379 B1 | | 3/1988 | |
| EP | 570601 A1 | * | 11/1993 | ............ 296/107.09 |
| JP | 02095923 A | * | 4/1990 | ................ 296/210 |
| JP | 04056628 A | * | 2/1992 | ............ 296/216.02 |
| JP | 05112138 A | * | 5/1993 | ................ 296/219 |

* cited by examiner

TARGA ROOF SYSTEM FOR VEHICLE AND ASSOCIATED VEHICLE

CROSS-REFERENCE

This application is the U.S. national stage filing of International Application No. PCT/DE2004/01472 filed Jul. 8, 2004, which claims priority to German patent application No. 103 31 625.6 filed Jul. 12, 2003.

TECHNICAL FIELD

The invention relates to a Targa roof system for a vehicle, as well as a vehicle equipped with a Targa roof system.

BACKGROUND ART

Targa roof systems form an intermediate solution between sun roofs and full convertibles. In sun roofs, merely a part of the roof is movable into another part, so that an opening results within the roof over the passenger compartment. In convertibles, the entire roof area, including the rear window, is openable from the upper side of the windshield frame towards the rear. In a Targa roof, a roof part is removable, which roof part is disposed between the upper side of a windshield and/or the windshield frame and a traverse cross beam that spans across the vehicle inner compartment and is spaced from the windshield and/or windshield frame, wherein this roof part is, generally speaking, relatively flat, so that it is stowable under the rear trunk lid or in the vehicle inner compartment, e.g., behind the driver/passenger seat.

A vehicle roof is known from DE 100 32 378 C2 that concerns the functionality of a convertible roof, in which a forward roof part and a rear roof part, which includes a rear window, are movably borne on the vehicle body and are storable in a storage compartment behind the driver/passenger seat. The forward roof part is borne by means of a pivot beating device that is slidably borne on a guide device that is affixed to the vehicle body; the pivot bearing device moves along the guide device when opening and storing the forward roof part, whereby the forward roof part lowers into the roof storage compartment. The pivot bearing device is constructed as a multi-hinge mechanism that is, as a whole, slidably borne on the guide device. A peculiarity of the known vehicle roof is its relatively complicated design. Furthermore, the roof part must be carefully guided by hand during its lowering, because it is pivotable relative to the vehicle body-affixed guide device due to the multi-hinge mechanism and thus can be scratched when it is not carefully handled.

A Targa roof system is described in DE 101 26 974 C1, in which a roof part is movable from a closed position covering the vehicle inner compartment into a storage position, wherein the movement is guided by a sliding device. The sliding device comprises a forward guide rail and a rear guide rail on each side of the vehicle; the roof part is slidably and pivotably borne on the sliding device and is movable into the roof storage compartment. The roof part is pivotably borne on the rear guide rails by means of a rotary-slide bearing and on the forward guide rails by means of respective intermediate hinge devices, which are borne on the forward guide rail and are connected with the roof part at a forward rotary-hinge.

SUMMARY

The object underlying the invention is to create a Targa roof system for a vehicle that is simply and conveniently manageable by its construction.

This object is solved by a Targa roof system for a vehicle including a roof part for spanning a compartment between a cross member, including the upper side of a windshield, and traverse cross beam, which traversley spans a vehicle inner compartment and is spaced from the cross member. Two guide rails preferably extend from the roof to the vehicle floor and each guide rail is disposable on a side of the vehicle in the area underneath the traverse cross beam. A guide device is preferably on each side of the roof part in the rear area thereof. The guide device preferably facilitates an upward pivoting of the roof part about its rear area and a subsequently lowering into the vehicle inner compartment by sliding the guide elements along the guide rails. Furthermore, each guide device preferably includes two guide elements fixedly attached in the rear area of the roof part. The guide elements are preferably spaced from each other in the longitudinal direction of the roof part, so that the roof part is pivotable at each of the two guide elements, which oppose each other with reference to the vehicle width, from its closed position and is subsequently lowerable downwardly guided along the guide rails into a stowed position by the forward guide element and the rear guide element without pivoting relative to the guide rails.

By the use of the inventively-provided guide elements fixedly affixed on both sides of the roof part at its rear area with a spacing therebetween, it is achieved that the roof part is not pivotable relative to the guide rails during its lowering along guide rails, so that it can be securely and conveniently lowered and stowed.

In a more preferred Targa roof system, the forward guide elements are pivotably borne at an axis on lateral longitudinal cross beams, which are affixed to the vehicle, for pivoting the roof part. In this case, when the roof part is upwardly pivoted, the rear guide elements preferably move downwardly in the guide rails by pivoting the guide rails about respective linkages located at the floor area of the vehicle.

In another preferred Targa roof system, rail pieces are pivotably borne at the axis on the side cross beams and the forward guide elements are slidably and latchably held on the roof part is fully upwardly titled, so that the guide elements are movable away from the guide pieces and into the guide rails.

In another preferred Targa roof system, the guide rails preferably are pivotable together with the roof part into an abutment position when the roof part has been lowered into the stowed position. In another preferred Targa roof system, a forward area of the roof part is transparent.

In a preferred aspect of the present teachings, a vehicle includes a roof system according to any of the above-described aspects. More preferably, in such a vehicle, traverse cross beams are removable on both sides of the roof part after opening of the roof part.

BRIEF DESCRIPTION OF THE DRAWINGS

The invention will be elucidated in the following with the help of exemplary schematic drawings and with further details.

The drawings show.

DETAILED DESCRIPTION OF THE INVENTION

Figure 1:
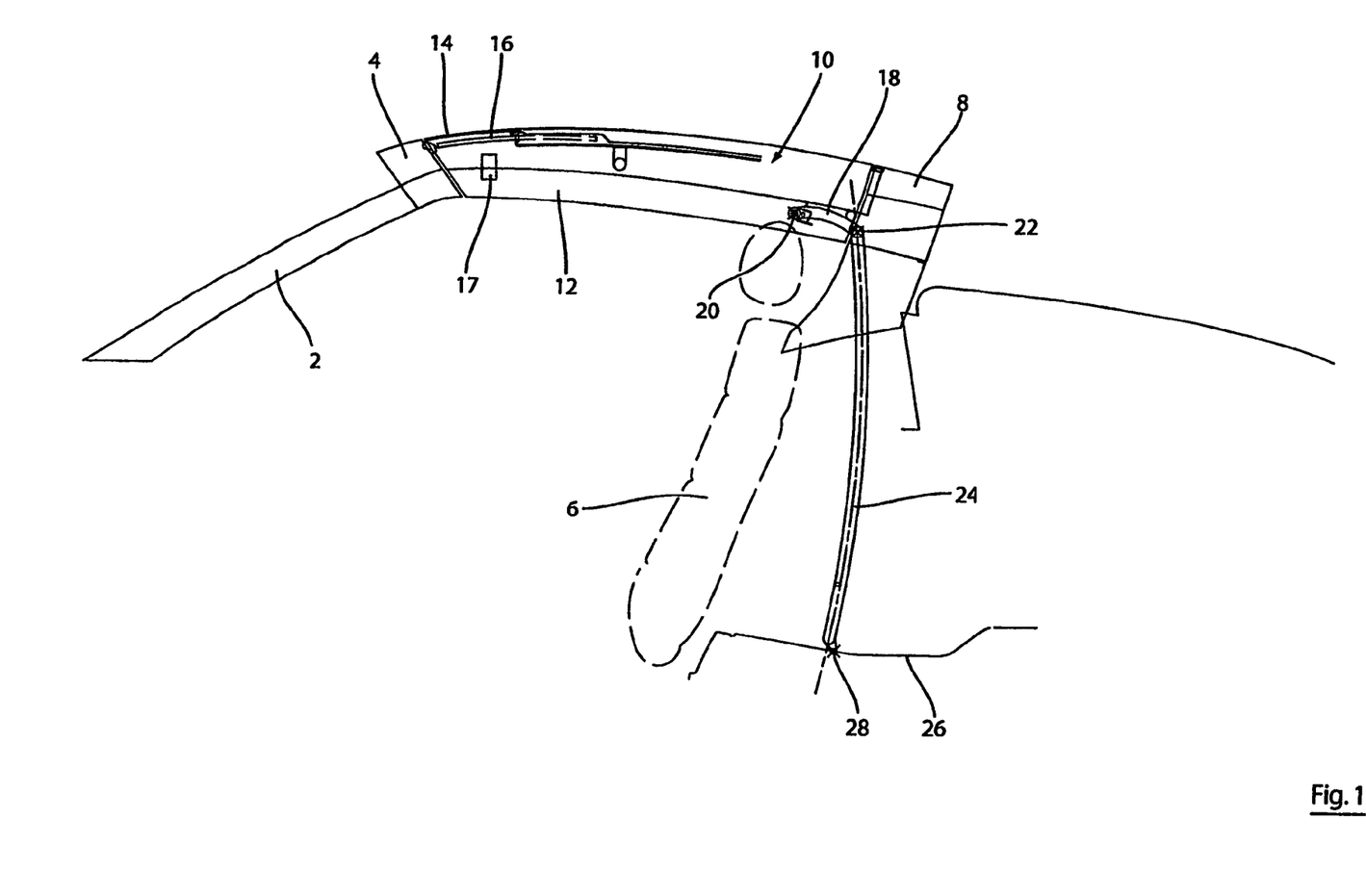
FIG. 1 a side view, partly in section, of an inventive Targa roof system.

According to FIG. 1, which shows a schematic side view, partly in section, of a detail of a cut-out of a vehicle equipped with a Targa roof system, a not-visible windshield is held in a windshield frame, whose left side pillar 2 and whose upper cross member 4 are visible.

A transverse cross beam 8 is affixed to the vehicle body and is arranged in the area of the back rest 6, or behind the back rest 6, of a driver-and passenger-seat; the transverse cross beam 8 generally forms a structural component of the vehicle body.

A flat roof part 10 extends from the cross member 4 of the windshield frame to the transverse cross beam 8, which flat roof part 10 laterally abuts on longitudinal cross beams 12; the longitudinal cross beams 12 connect the side pillars 2 and/or the cross member 4 with the transverse cross beam 8.

In its middle area, the forward area of the roof part 10 is formed as transparent area 14, e.g., from laminated glass or Plexiglas. For shading the transparent area 14, a slide panel 16 is movable within the roof part 10 in a known manner.

For latching the roof part 10 on the vehicle, a latching mechanism, e,g, operable by a single grip 17, is provided in a known manner; the latching mechanism latches the roof part 10 to the cross member 4, as well as, if necessary, to the transverse cross beam 8 and the longitudinal cross beam 12.

A bracket 18 is fixedly attached on both sides of the rear area of the roof part 10; each bracket 18 comprises a forward guide element 20 and a rear guide element 22, which are spaced somewhat from each other in the longitudinal direction of the vehicle and/or in the width direction of the roof part 10.

The rear guide element 22 projects into a guide rail 24; the guide rail 24 is pivotably guided at hinge 28 in the vehicle inner compartment on both sides of the vehicle body close to the vehicle body floor 26. The forward guide element 20 is designed as a slide block that is, in the position shown in FIG. 1, non-slidably held by means of a latch 30 on a rail piece 32; the rail piece 32 is pivotably affixed to the longitudinal cross beam 12 so as to pivot about an axis 34 (for more detailed illustration, see FIGS. 3 to 6).

Figure 2:
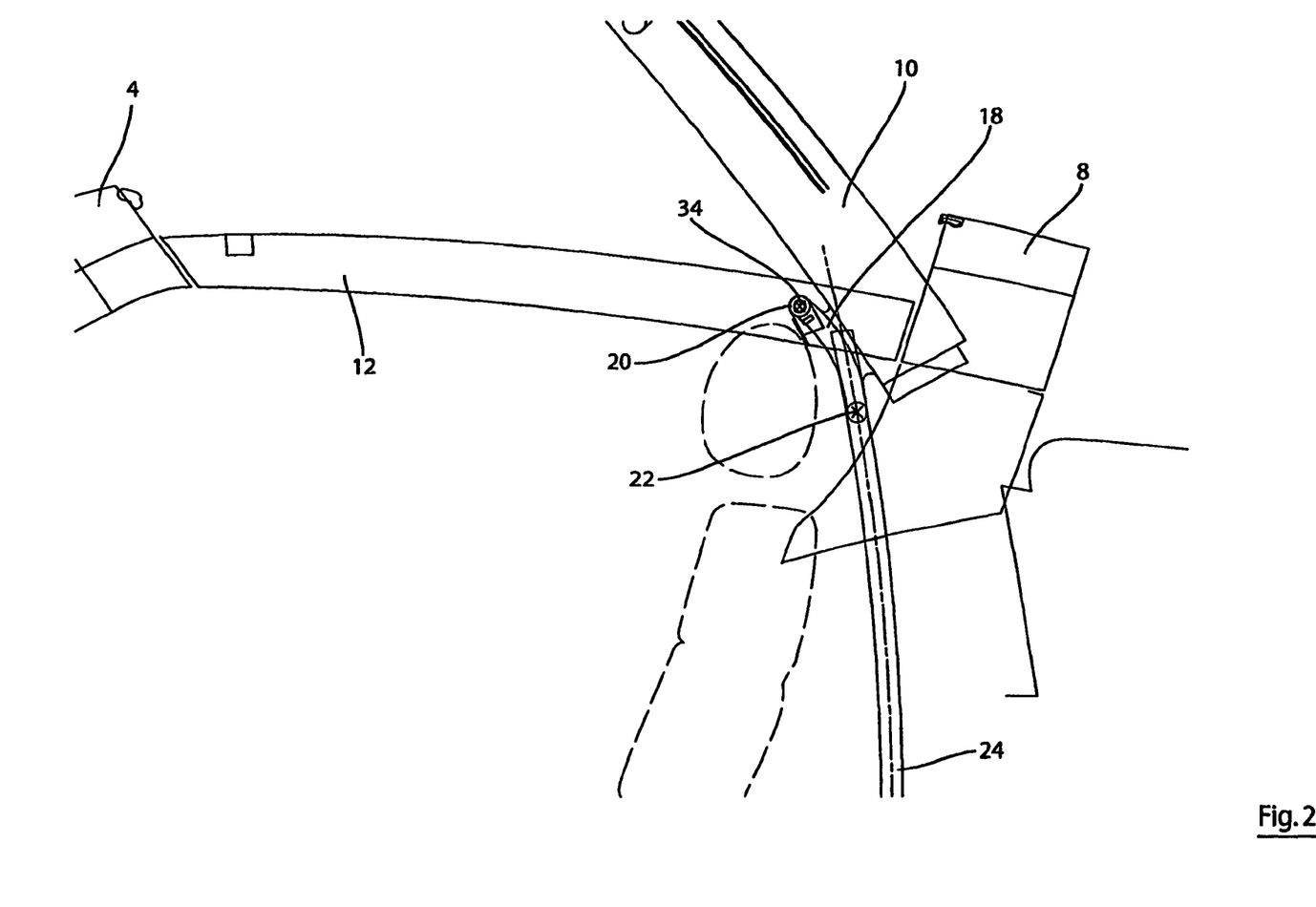
FIG. 2 a cut-out from FIG. 1 with a raised roof part.

FIG. 2 shows a cut-out view of the assembly according to FIG. 1, in which the latch 30 has been released by means of the grip 17 and the roof part 10 has been upwardly tilted. As in apparent, the roof part 10 is upwardly titled about the axis 34. When upwardly tilting the roof part 10 about the axis 34, the rail piece 32, which is borne on the longitudinal cross beam 12, pivots in the clockwise direction together with the slidable block-shaped guide element 20, which is affixed to the bracket 18 and latched to the longitudinal cross beam 12. As a result, the guide element 22 slides in the guide rail 24 with simultaneous pivoting of the guide rail 24 in the counter-clockwise direction about the hinge, until the guide rail 24 comes into abutment with a stopper part 36 that projects from the rail piece 32.

Figure 3:
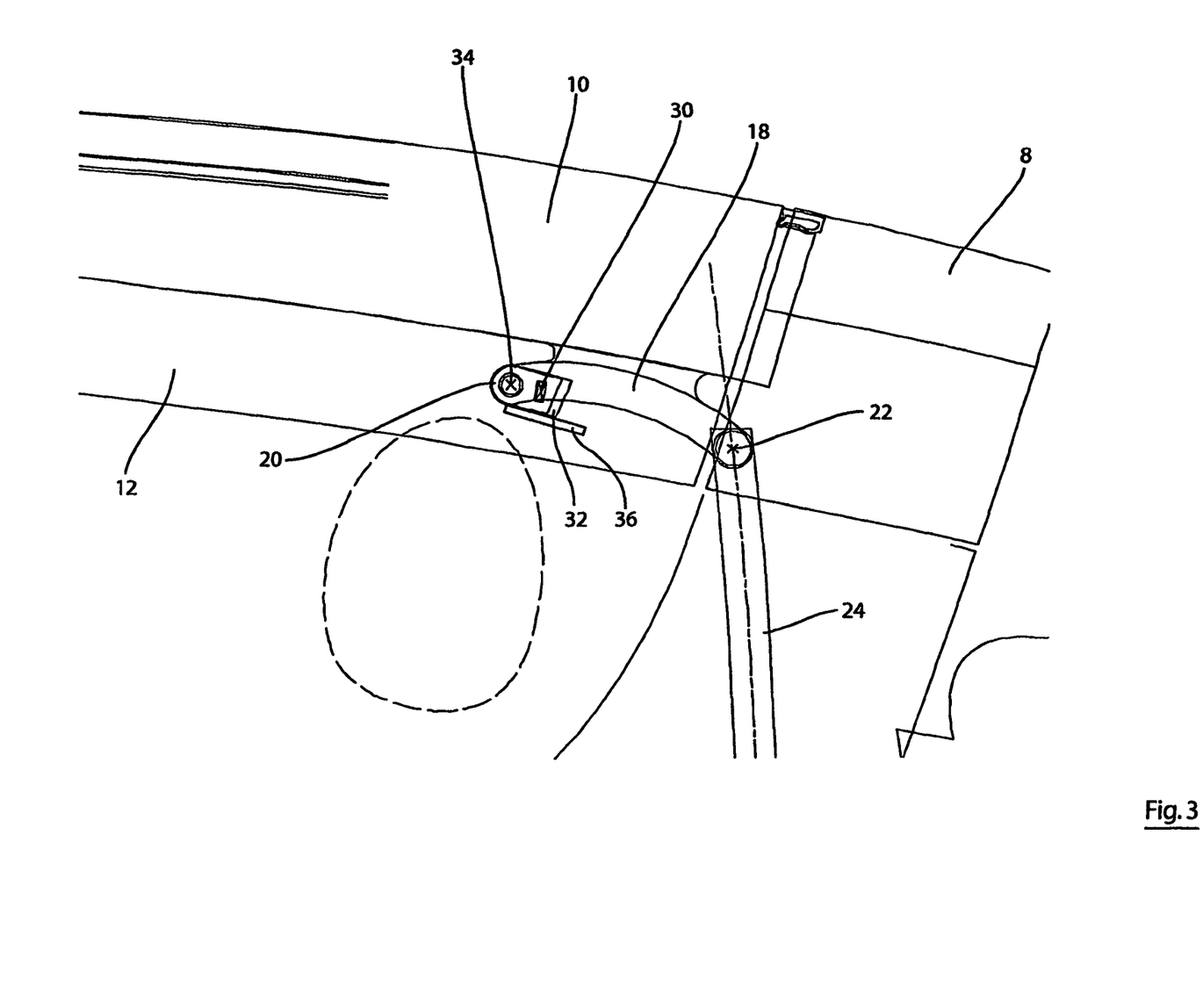
FIGS. 3-6 detailed views of FIG. 1 in different positions of the roof part.

FIG. 3 more precisely shows the construction of the bracket 18 with the guide elements 20 and 22. The roof part 10 is in its closed position The guide element 22 is slidably accommodated within the guide rail 24, wherein a retaining device thereof, so that the guide element 22 is not movable out of the guide rail 24 towards the top, is not required, because the upward movability of the roof part 10 is limited by its abutment on the inner side of the transverse cross beam 8.

Figure 4:
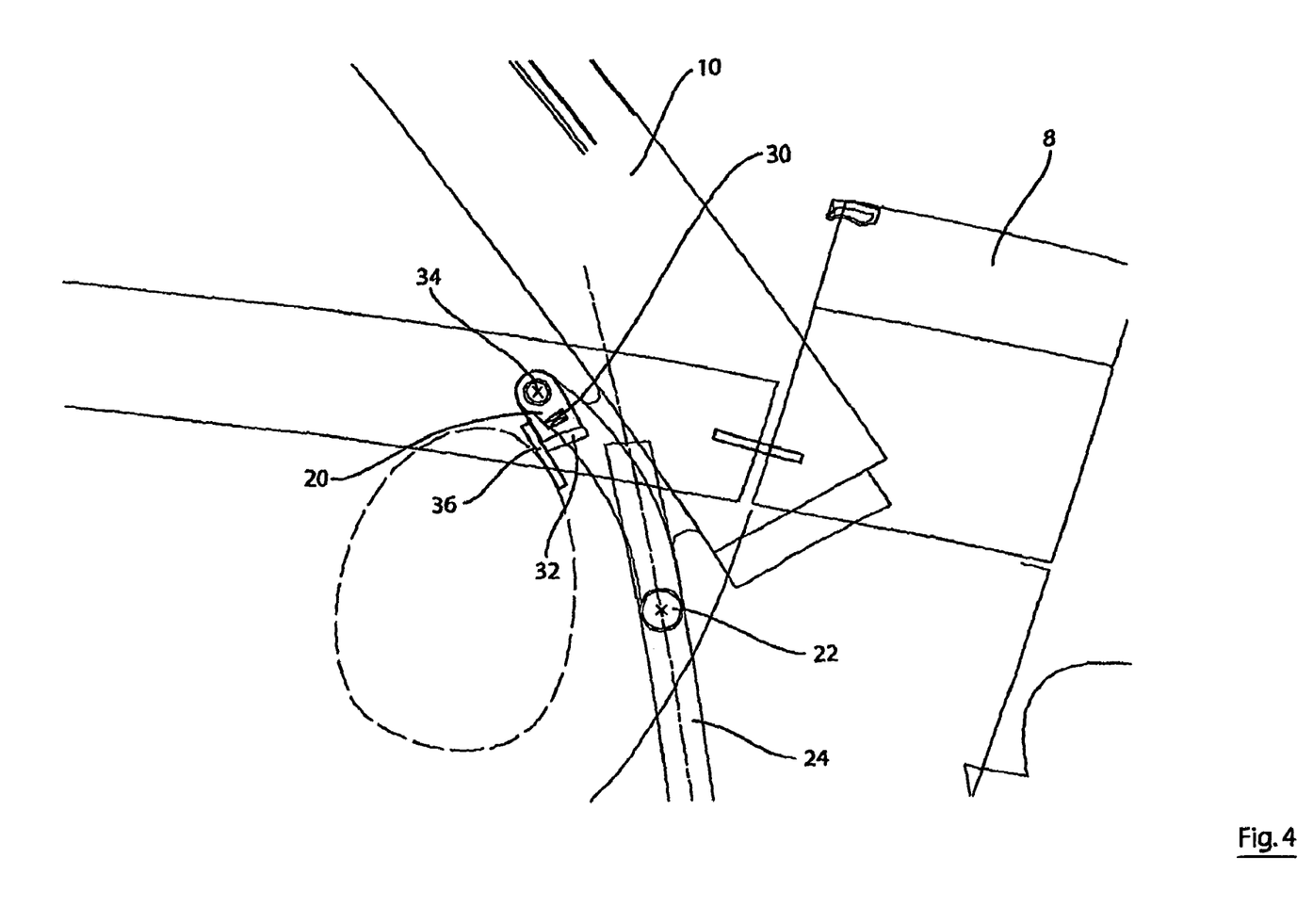

FIG. 4 shows the roof part 10 approximately in the position shown in FIG. 2, however in enlarged scale. As is apparent, the roof part 10 is already somewhat lowered, so that the guide element 22 has moved downwards in the guide rail 24 and the guide rail 24 is pivoted in the counter-clockwise direction.

Figure 5:
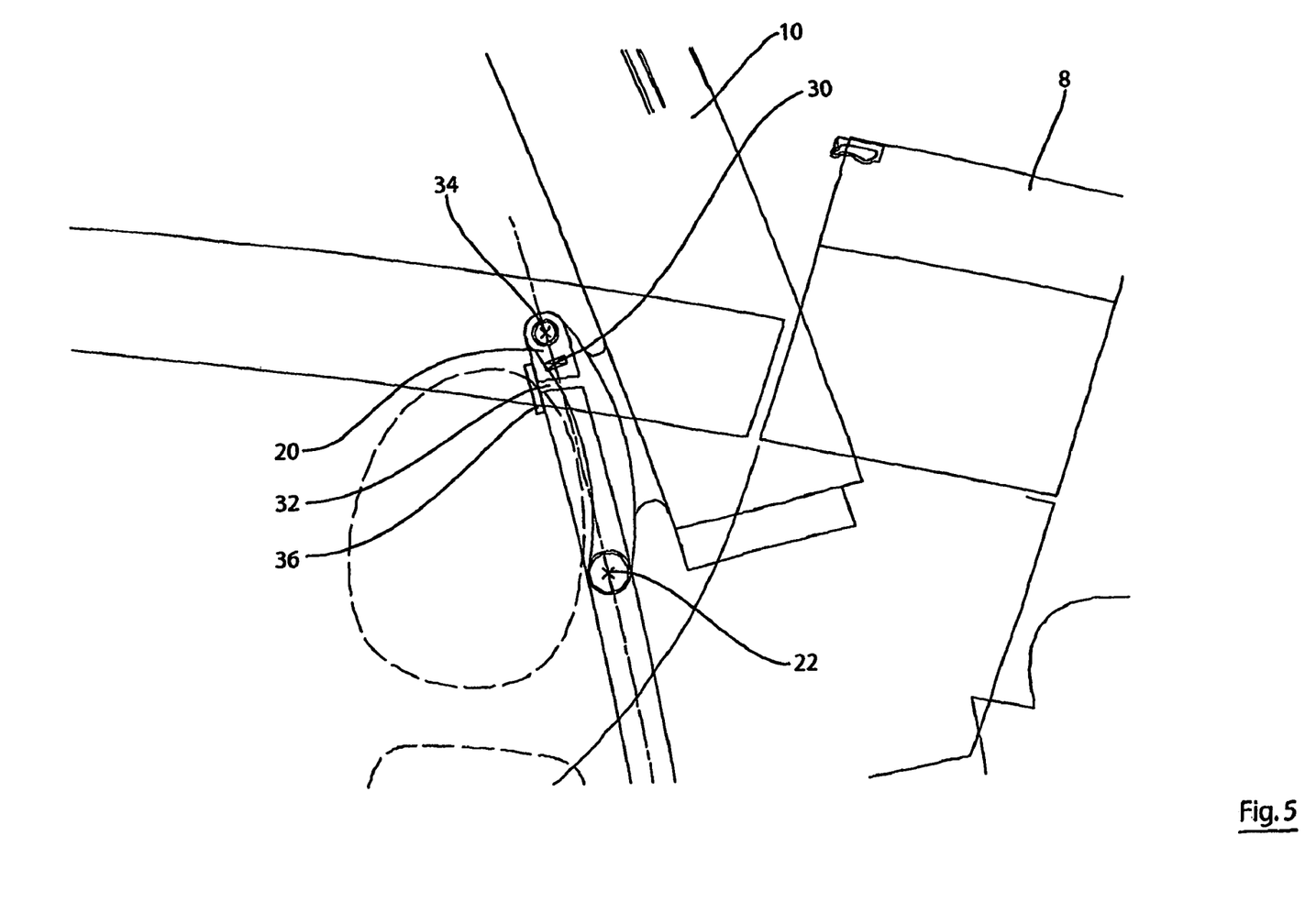
Figure 6:
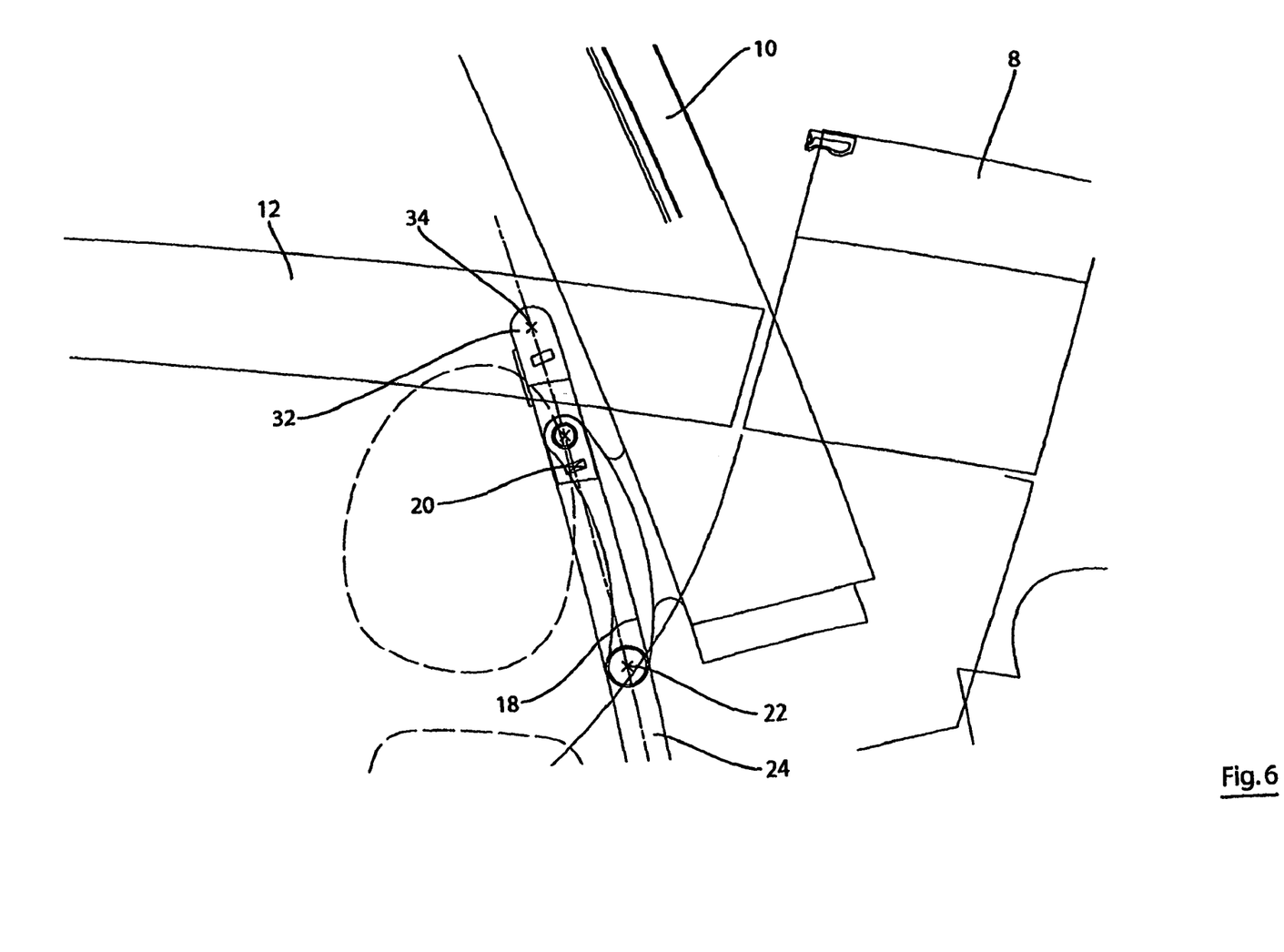

FIG. 5 shows the assembly according to FIG. 4 in a further upwardly-tilted position of the roof part 10, wherein in the position shown in FIG. 5 the stopper part abuts on the guide rail 24, so that the guide rail 24 is brought into line with the rail piece 32 and further upward tilting of the roof part is not possible. In this state, the rail piece 32 is latched with the guide rail 24 by means of the latch 30 and simultaneously the slideability of the guide element 20 along the guide rail is enabled, so that the element 20 can move away from the rail piece 32 and into the guide rail 24.

Figure 7:
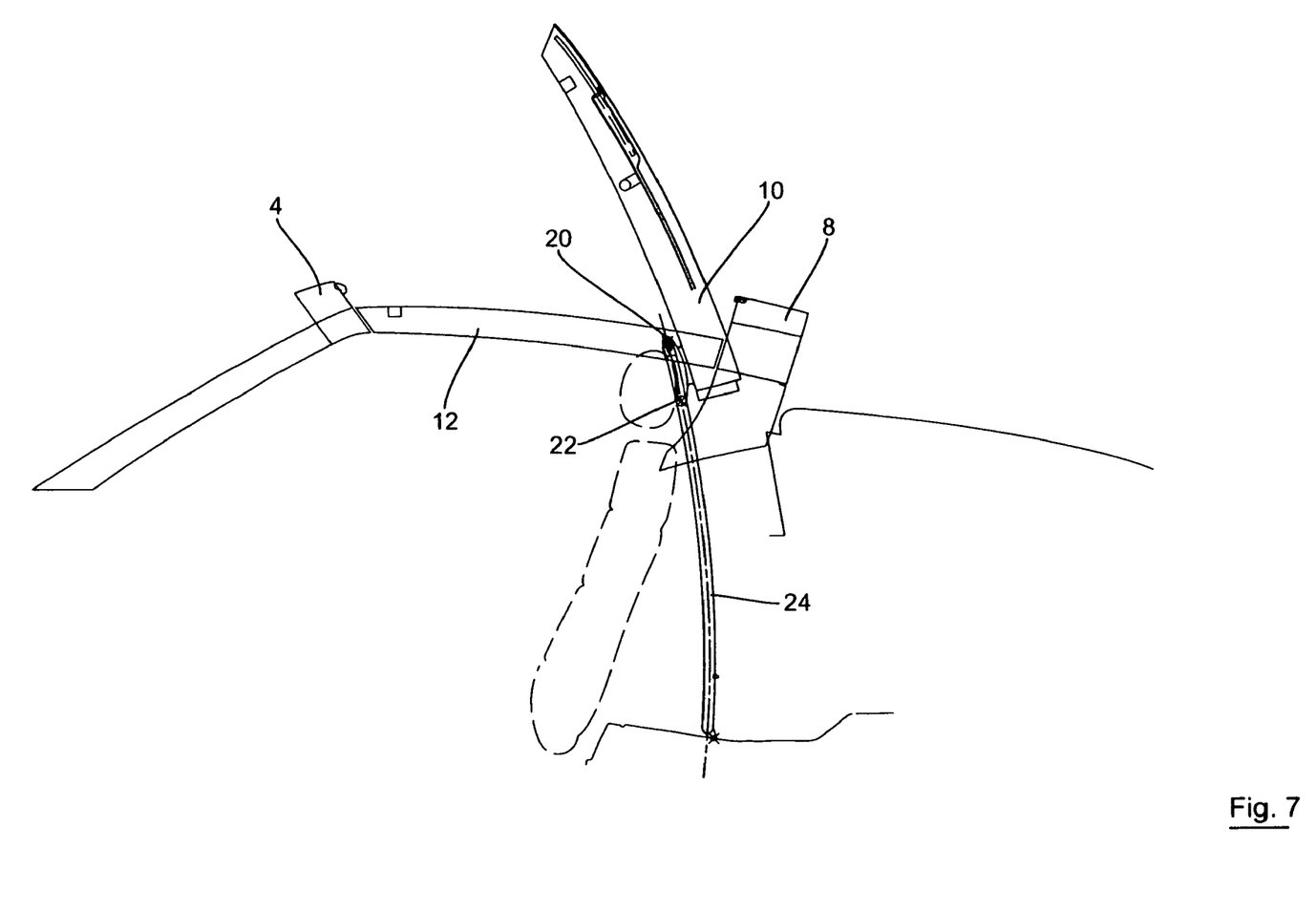
FIG. 7 a view similar to FIG. 1 of a fully-raised roof part.
Figure 8:
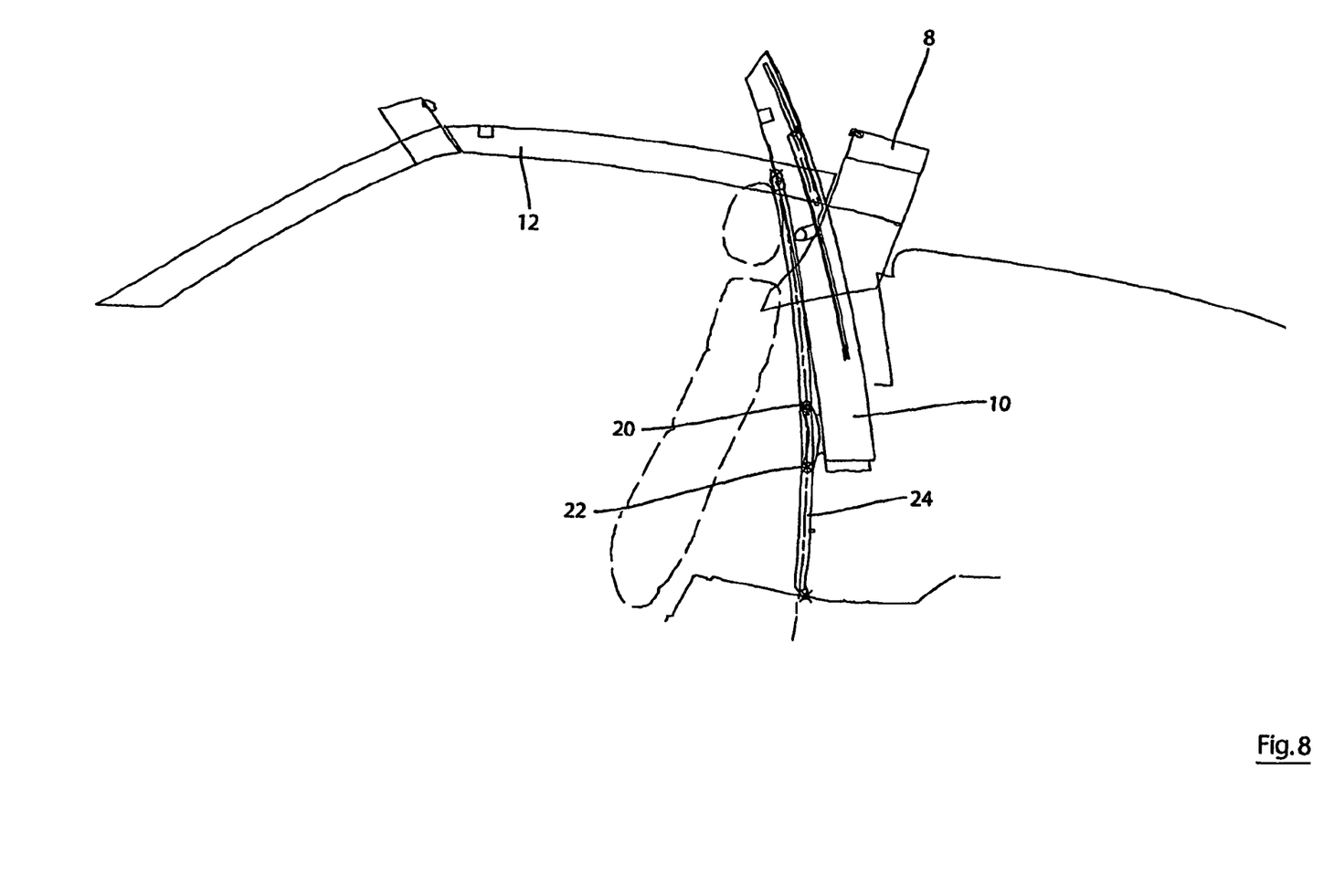
FIG. 8 the view of FIG. 7 of a half-lowered roof part.
Figure 9:
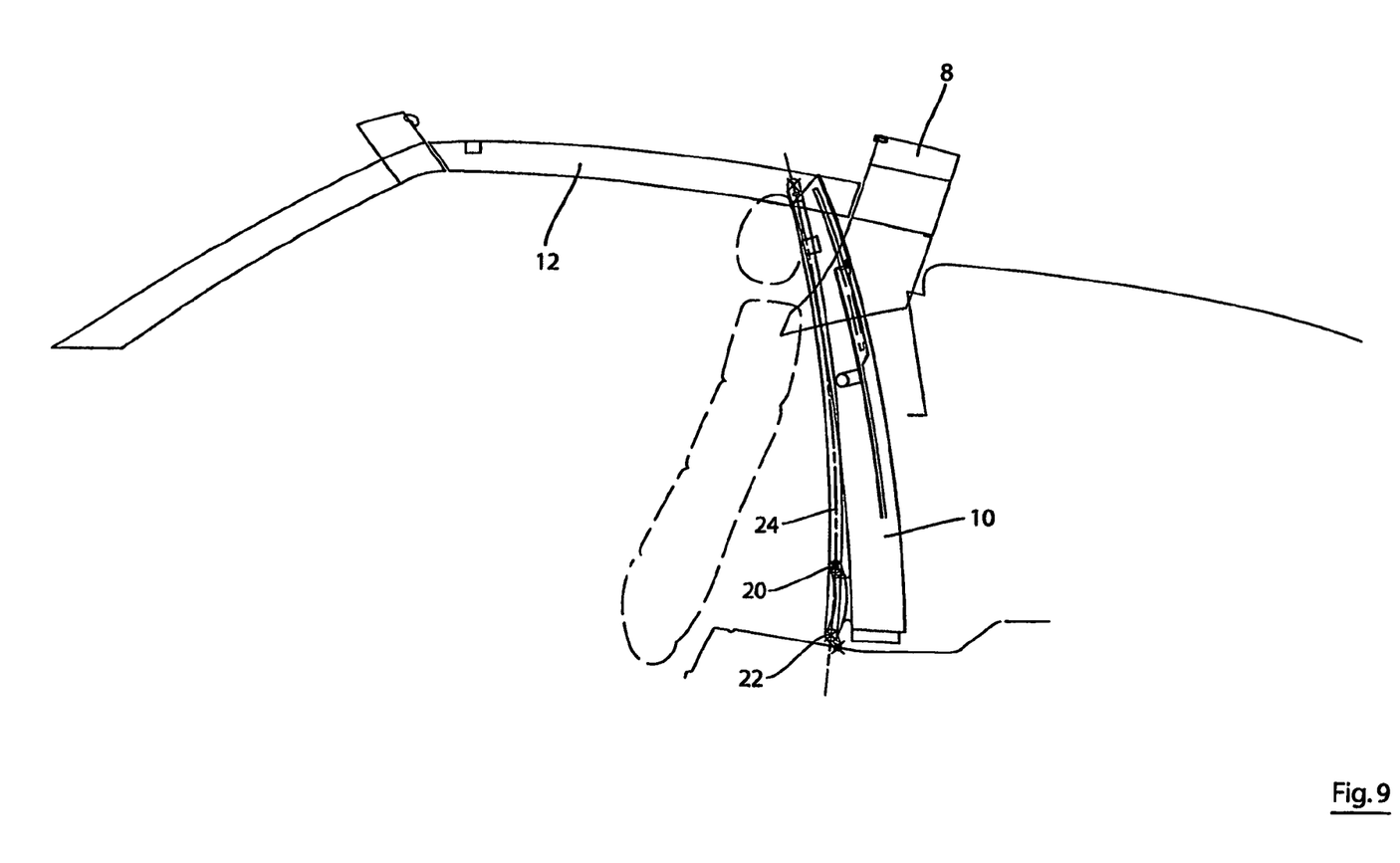
FIG. 9 the view of FIG. 7 of a fully-lowered roof part.

Starting from the state, in which the rail piece 32 is latched with the guide rail 24, the roof part 10 can not be further titled relative to the guide rail 24, because it is held, secured from tilting, above the guide elements 20 and 22. The roof part 10 can now be lowered in a well-defined manner along the guide rail 24 from the position shown in FIG. 7 to the position shown in FIG. 8 until the guide element 22 about on an abutment defined on the lower end of the guide rail 24 (FIG. 9). In this stowed position, the roof part 10 has moved to underneath the transverse cross beam 8 in the vehicle inner compartment, so that it can be tilted, together with the guide rail 24, in the clockwise direction about its hinge 28 (detailed view in FIG. 11) into an abutment position shown in FIG. 10; in this abutment position, the compartment behind the back rest 6 is only minimally narrowed by the roof part 10.

The latching of the position of the guide rails by latching the rail piece 32 to the guide rail 24 can be automatically released when the roof part 10 arrives in its stowed position shown in FIG. 9 or can be manually de-latchable.

Figure 10:
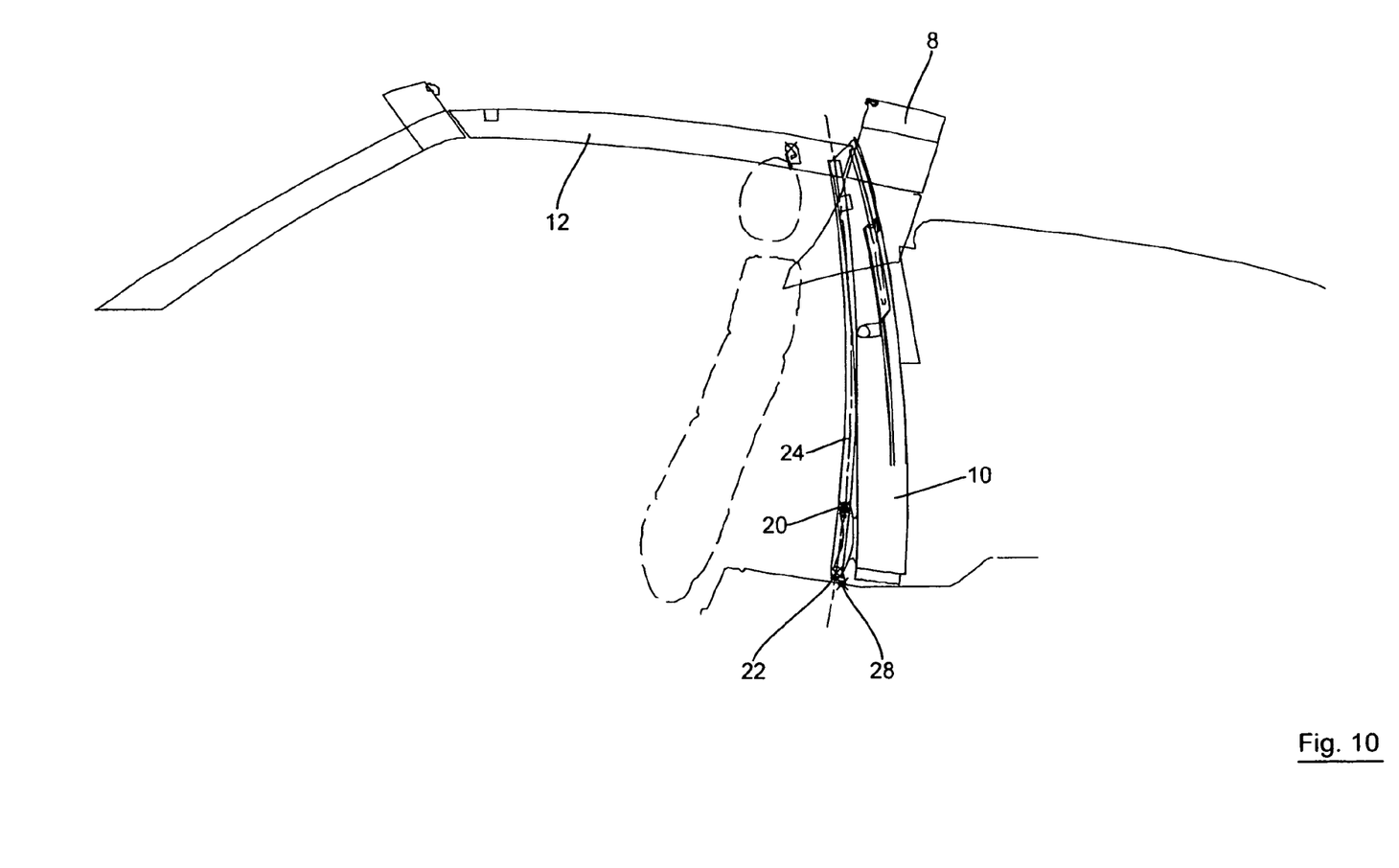
FIG. 10 the view of FIG. 9 of a full-lowered roof part pivoted into a storage position and FIG. 11 a detailed view of FIG. 10.
Figure 11:
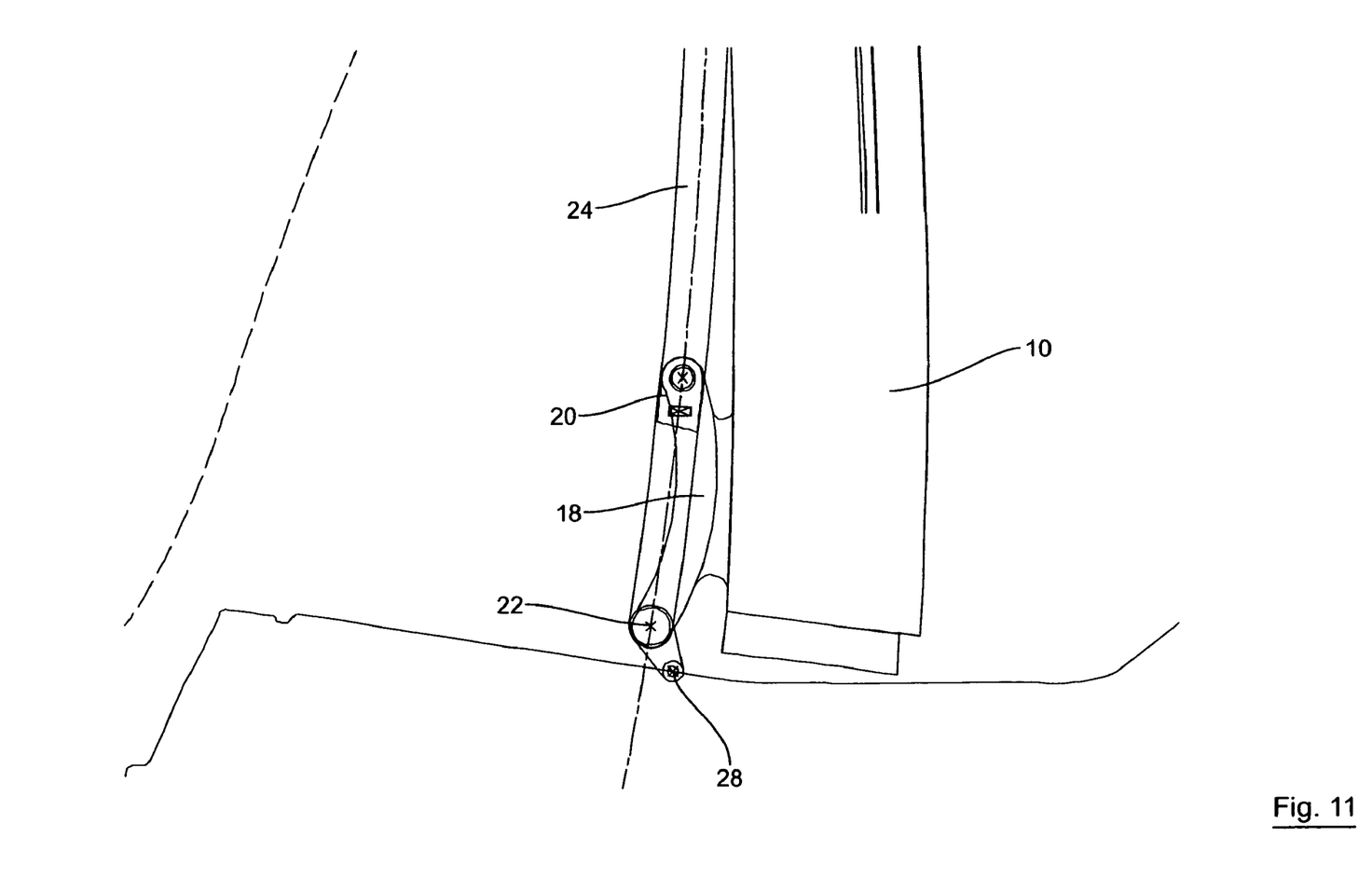

The abutment position shown in FIG. 10 can be latched via the grip 17 provided on the roof part 10, which is conveniently accessible. In this latching process, pins can extend laterally out of the roof part 10 and engage in corresponding recesses in the transverse cross beam 8. In the alternative, the latching to the transverse cross beam 8 can also take place using the latch 30.

When the roof part 10 is located in the abutment position show in FIG. 10, the longitudinal cross beams 12 can be takes out, so that the space over the passenger compartment is bounded only by the windshield cross member 4 and the transverse cross beam 8.

When the roof part 10 is located in the abutment position shown in FIG. 10, the view towards the rear in the middle area of the inner compartment is possible due to the transparent area 14 of the roof part 10, so that the view towards the rear through a not-shown rear window accommodated in the traverse cross beam 8 and through the roof part 10 is not restricted. In particular, the view through an inside rearview mirror towards the rear is not restricted.

For closing the roof, the processes are performed in the reverse sequence. The side cross beams 12 are reinserted.

The roof part is pivoted forwardly together with the guide rail from the abutment position shown in FIG. 10 into the stowed position shown in FIG. 9, wherein the end position is again locked by latching between the rail piece 32 and the guide rail 24. The roof part 10 is then upwardly shifted into the position shown in FIG. 6, wherein the movement of the roof part is guided by the guide rails 24 and tilting takes place and the roof part can be, when it is fully raised into the position shown in FIG. 5, pivoted forwardly by further raising and is latched in the closed position.

The described apparatus can be modified in many ways.

For example, the guide elements 20 and 22 can be formed solely by two lateral pins fixedly attached to the bracket 18, wherein the rear pin (guide element 22) is continuously accommodated in the guide rail 24, and the forward pin (guide element 20) is accommodated in a guide groove, which guide groove is formed in the longitudinal cross beam 12, such that the forward guide pin is only movable out of the guide groove when it is aligned in the direction of the guide rail 24 according to FIG. 5. The stopper part 36 can then be directly formed by a wall of the groove. In this case, the guide piece borne on the longitudinal cross beam can be omitted.

For the individual latches, various automatic devices operated via an end switch or manually-operated devices are useable.

In one modified embodiment, the upper end of the guide rail 24 can be formed, such that the guide element 22 comes free from the guide rail 24 in the position shown in FIG. 3, so that the guide rail 24 is pivotable in the clockwise direction further rearwardly into a position, in which it is accommodated as far rearward as possible in the transverse cross beam 8.

In a simplified embodiment, the guide rails 24 are not pivotable. The guide element 22 attached to the roof part 10 is latched in the guide rail 24 in its uppermost position and forms a hinge, about which the roof part 10 is upwardly pivotable. As such, the guide element 20 moves upwardly out of a guide groove of the longitudinal cross beam 12 and is subsequently lowerable together with the guide element 22, wherein it is inserted from above into the guide rail 24. Also in such a simplified embodiment, in which design freedom is limited by the form of the junction between the rear end of the roof part 10 and transverse cross beam 8, a tilt-free lowering of the roof part 10 is possible. In such an embodiment, the transverse cross beam 8 can be partially opened in order to create space for the roof part 10 that travels rearwardly during upward tilting.

The longitudinal cross beams 12 can be integral components of the roof part 10. The guide elements 20 then first begin to function when they are moved into the guide rails 24 after upward tilting of the roof part 10. As a whole, a Targa roof is created with the invention that is movable out of the closed position into the stowed position merely by operation of the grip 17 and vice versa, wherein for this purpose merely one hand is required.

REFERENCE NUMBER LIST

2 Side Pillar
4 Cross Member
6 Backrest
8 Transverse Cross Beam
10 Roof Part
12 Longitudinal Cross Beam
14 Transparent Area
16 Slide Panel
17 Grip
18 Bracket
20 Guide Element
22 Guide Element
24 Guide Rail
26 Floor
28 Hinge
30 Latch
32 Rail Piece
34 Axis
36 Stopper Part

The invention claimed is:

1. A Targa roof system for a vehicle including:
   a roof part arranged and constructed to be latched to a cross member, which includes or is attached to an upper side of a windshield,
   a first guide rail disposeable on a first lateral side of the vehicle and a second guide rail disposeable on a second lateral side of the vehicle, each guide rail being arranged and constructed to extend substantially from a roof of the vehicle to a floor of the vehicle, and having a centerline
   a first forward guide element and a first rear guide element attached on a first lateral side of a rear area of the roof part, and
   a second forward guide element and a second rear guide element attached on a second lateral side of the rear area of the roof part, the forward guide elements being spaced from the rear guide elements in a longitudinal direction of the roof part,
   wherein the roof part is pivotable via the guide elements with respect to the roof about the rear area of the roof part from a closed position into an upwardly tilted position and then is downwardly lowerable into a stowed position by guiding the first forward guide element and the first rear guide element in the first guide rail so as to move along the first rail centerline and by guiding the second forward guide element and the second rear guide element in the second guide rail so as to move along the second rail centerline without pivoting the roof part relative to the guide rails for at least a portion of downward movement.

2. A Targa roof system according to claim 1, wherein each forward guide element is pivotably borne at an axis located on longitudinal cross beams arranged and constructed to be affixed on the respective first and second lateral sides of the vehicle, the forward guide elements being arranged and constructed to pivot the roof part, so that when the roof part is upwardly pivoted, the rear guide elements move downwardly in the respective guide rails by pivoting of the guide rails about respective linkages arranged and constructed to pivotably couple the guide rails to the vehicle floor.

3. A Targa roof system according to claim 2, further comprising a rail piece pivotably borne at the axis located on the longitudinal cross beams, the forward guide elements being slidably and latchably holdable on the respective rail pieces.

4. A Targa roof system according to claim 3, wherein the rail pieces are arranged and constructed to come into an aligned abutment state with the respective guide rails when the roof part is fully upwardly tilted, so that the guide elements are movable away from the respective rail pieces and into the respective guide rails.

5. A Targa roof system according to claim 4, wherein the guide rails are pivotable together with the roof part into an abutment position when the roof part has been lowered into the stowed position.

6. A Targa roof system according claim 5, wherein a forward end of the roof part is transparent.

7. A Targa roof system according to claim 1, wherein the guide rails are pivotable together with the roof part into an abutment position when the roof part has been lowered into the stowed position.

8. A Targa roof system according claim 1, wherein a forward end of the roof part is transparent.

9. A vehicle comprising:
a cross member, of a windshield frame,
a first roof part,
a second roof part latchable with the cross member when the second roof part is disposed in a closed position,
at least two guide rails extending substantially between the first roof part and a floor of the vehicle, each guide rail being disposed on a lateral side of the vehicle, and
a forward guide element and a rear guide element disposed on each lateral side of the second roof part in a rear area thereof, wherein each forward guide element is spaced from each rear guide element in a longitudinal direction of the second roof part,
wherein the second roof part is pivotable via the guide elements with respect to the first roof part about the rear area of the second part from a closed position into an upwardly tilted position and then is downwardly lowerable into a stowed position by being guided along the guide rails via the forward guide elements and the rear guide elements without pivoting relative to the guide rails for at least a portion of the downward movement, and
wherein the guide rails are pivotable together with the second roof part into an abutment position at least when the second roof part has been lowered into the stowed position.

10. A vehicle according to claim 9, wherein the first roof part comprises a longitudinal cross beam disposed on each lateral side of the second roof part, the longitudinal cross beams being removable from the vehicle at least when the second roof part is disposed in the stowed position.

11. A vehicle according to claim 10, wherein each forward guide element is pivotably borne at an axis located on the longitudinal cross beams, the forward guide elements being arranged and constructed to pivot the second roof part, so that when the second roof part is upwardly pivoted, the rear guide elements move downwardly in the guide rails by pivoting of the guide rails about respective linkages pivotably coupling the guide rails to the vehicle floor.

12. A vehicle according to claim 11, further comprising a rail piece pivotably borne at the axis located on the longitudinal cross beams, the forward guide elements being slidably and latchably holdable on the respective rail pieces.

13. A vehicle according to claim 12, wherein the rail pieces are arranged and constructed to come into an aligned abutment state with the guide rails when the second roof part is fully upwardly tilted, so that the guide elements are movable away from the respective rail pieces and into the guide rails.

14. A vehicle according to claim 13, wherein each set of forward and rear guide elements is rigidly attached to the second roof part and is arranged and constructed to slide along a single guide rail.

15. A vehicle according to claim 14, wherein a forward end of the second roof part is transparent.

16. A vehicle according to claim 9, wherein each set forward and rear guide elements is rigidly attached to the second roof part and is arranged and constructed to slide along a single guide rail.

17. A vehicle according claim 9, wherein a forward end of the second roof part is transparent.

18. A Targa roof system for a vehicle including:
movable roof section,
first and second guide elements rigidly affixed to a rear portion of the movable roof section, the first and second guide elements being spaced in a longitudinal direction of the movable roof section and being arranged and constructed to enable the movable roof section to upwardly pivot from a closed position about at least the first guide element,
a guide rail arranged and constructed to receive the first and second guide elements so as to guide movement of the movable roof section along the guide rail into stowed position defined within a vehicle inner compartment, the guide rail being disposeable on a lateral side of the vehicle,
wherein the movable roof part is downwardly lowerable from an upwardly pivoted position into the stowed position by guiding the first and second guide elements along the guide rail without pivoting of the moveable roof part relative to the guide rail for at least a portion of the downward movement.

19. A Targa roof system according to claim 18, wherein the first guide element is pivotably borne at an axis located on a longitudinal cross beam arranged and constructed to be affixed on the lateral side of the vehicle, the first guide element being arranged and constructed to pivot the movable roof part, so that when the movable roof part is upwardly pivoted, the second guide element moves downwardly in the guide rail by pivoting of the guide rail about a hinge arranged and constructed to couple the guide rail to a floor of the vehicle.

20. A Targa roof system according to claim 19, further comprising a rail piece arranged and constructed to be pivotably borne at the axis defined by the longitudinal cross beam, the first guide element being slidably and latchably holdable on the rail piece, wherein the rail piece is arranged and constructed to come into an aligned abutment state with the guide rail when the movable roof part is fully upwardly tilted, so that the guide elements are movable away from the rail piece and into the guide rail, and wherein the guide rail is pivotable together with the movable roof part via the hinge into an abutment position when the movable roof part has been lowered into the stowed position.

* * * * *